United States Patent
Iyama et al.

(10) Patent No.: US 9,360,697 B2
(45) Date of Patent: Jun. 7, 2016

(54) LIQUID-CRYSTAL DISPLAY PANEL AND LIQUID-CRYSTAL DISPLAY DEVICE

(75) Inventors: Yuichi Iyama, Osaka (JP); Hisashi Watanabe, Osaka (JP); Eiji Satoh, Osaka (JP); Yasushi Asaoka, Osaka (JP); Akira Sakai, Osaka (JP); Akiko Miyazaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 234 days.

(21) Appl. No.: 14/344,092

(22) PCT Filed: Sep. 6, 2012

(86) PCT No.: PCT/JP2012/072751
§ 371 (c)(1),
(2), (4) Date: Mar. 11, 2014

(87) PCT Pub. No.: WO2013/038984
PCT Pub. Date: Mar. 21, 2013

(65) Prior Publication Data
US 2014/0368774 A1  Dec. 18, 2014

(30) Foreign Application Priority Data
Sep. 12, 2011 (JP) .................. 2011-198740

(51) Int. Cl.
*G02F 1/1339* (2006.01)
*G02F 1/1335* (2006.01)
*G02F 1/1337* (2006.01)

(52) U.S. Cl.
CPC ........ *G02F 1/133512* (2013.01); *G02F 1/1337* (2013.01); *G02F 1/133528* (2013.01); *G02F 2001/13356* (2013.01)

(58) Field of Classification Search
CPC ............ G02F 1/133512; G02F 1/1337; G02F 1/133528; G02F 2001/13356
USPC .................... 349/58, 153, 158, 190
See application file for complete search history.

(56) References Cited

U.S. PATENT DOCUMENTS 4,834,509 A    5/1989  Gunjima et al.
5,084,777 A *  1/1992  Slobodin ........................ 349/27

(Continued)

FOREIGN PATENT DOCUMENTS

JP       2550627 B2      11/1996
JP   2000-305100 A      11/2000

(Continued)

OTHER PUBLICATIONS

Official Communication issued in International Patent Application No. PCT/JP2012/072751, mailed on Dec. 11, 2012.

(Continued)

*Primary Examiner* — Hoan C Nguyen
(74) *Attorney, Agent, or Firm* — Keating & Bennett, LLP

(57) ABSTRACT

A liquid crystal display panel (100A) according to an embodiment of the present invention is a liquid crystal display panel including: a first substrate (2) having a pixel electrode (4) formed thereon; a second substrate (3) opposing the first substrate (2); and a liquid crystal layer (1) retained between the first substrate (2) and the second substrate (3). The liquid crystal layer (1) edges near at least one of side faces of the liquid crystal display panel (100A), and includes a black layer (52) in contact with the side face of the liquid crystal layer (1) along which the liquid crystal layer (1) edges near at least one of the side faces of the liquid crystal display panel (100A).

20 Claims, 8 Drawing Sheets (a)

(b)

(56) References Cited

U.S. PATENT DOCUMENTS

| | | | |
|---|---|---|---|
| 5,835,179 A * | 11/1998 | Yamanaka | 349/161 |
| 6,177,972 B1 * | 1/2001 | Held et al. | 349/88 |
| 6,429,914 B1 * | 8/2002 | Kubota et al. | 349/86 |
| 6,642,984 B1 | 11/2003 | Yoshida et al. | |
| 7,190,429 B2 | 3/2007 | Yoshida et al. | |
| 7,230,664 B2 | 6/2007 | Kubo et al. | |
| 7,292,300 B2 * | 11/2007 | Kubo et al. | 349/129 |
| 7,532,291 B2 | 5/2009 | Kubo et al. | |
| 7,719,656 B2 * | 5/2010 | Nakamura et al. | 349/167 |
| 7,728,937 B2 | 6/2010 | Kume et al. | |
| 7,843,540 B2 * | 11/2010 | Ozawa et al. | 349/141 |
| 7,995,177 B2 | 8/2011 | Shoraku et al. | |
| 8,345,197 B2 | 1/2013 | Shoraku et al. | |
| 8,421,972 B2 | 4/2013 | Ohgami et al. | |
| 2003/0197819 A1 * | 10/2003 | Sunohara et al. | 349/113 |
| 2009/0185101 A1 * | 7/2009 | Matsuhira et al. | 349/58 |
| 2011/0063558 A1 * | 3/2011 | Ishihara et al. | 349/141 |

FOREIGN PATENT DOCUMENTS

| | | |
|---|---|---|
| JP | 2004-326140 A | 11/2004 |
| JP | 2005-284139 A | 10/2005 |
| JP | 2006-003626 A | 1/2006 |
| WO | 2006/132369 A1 | 12/2006 |
| WO | 2009/084162 A1 | 7/2009 |

OTHER PUBLICATIONS

English translation of Official Communication issued in corresponding International Application PCT/JP2012/072751, mailed on Mar. 20, 2014.

* cited by examiner (a)

(b)

(a)　　　　　　　　　(b)

(a)

(b)

(a)

(b)

(c)

(a)

(b)

(a)

(b)

(c)

(a)

(b)

(c)

(a)

(b)

(a)

(b)

LIQUID-CRYSTAL DISPLAY PANEL AND LIQUID-CRYSTAL DISPLAY DEVICE

TECHNICAL FIELD

The present invention relates to a liquid crystal display panel and a liquid crystal display device.

BACKGROUND ART

Liquid crystal display devices have advantages such as light weight, thinness, and low power consumption, and are utilized not only for large-size television sets but also as small-sized display devices, e.g., display sections of mobile phones.

A liquid crystal display device includes a liquid crystal display panel, a backlight device, circuitry and a power supply for supplying various electrical signals to the liquid crystal display panel, and a housing which accommodates these. The liquid crystal display panel has a displaying region in which a plurality of pixels are arrayed, and a frame region around it.

The displaying region (active area) of a generic liquid crystal display device includes pixel electrodes, thin film transistors (TFTs), and the like provided therein, in which images, videos, or the like are displayed. In the frame region are provided: a sealing portion at which substrates are attached together so that a liquid crystal material is sealed in between the substrates; connection lines connected to the gate electrodes and source electrodes of the TFTs; terminals for connection with external driving circuits which input signal/scanning voltages; and so on. In the present specification, any region in which connection lines to the gate electrodes and source electrodes of TFTs, terminals for connection with external driving circuits which input signal/scanning voltages, and the like are located may be referred to as a connection region. In order to prevent deteriorations in display quality at the outer periphery of the active area due to leakage of light from the backlight, disorderly alignment of liquid crystal molecules, and so on, a black mask (light-shielding member) is usually provided in the frame region. Thus, the frame region is a region not contributing to displaying (invalid displaying portion). While liquid crystal display devices are becoming narrower and narrower in their frames each year, it is difficult to eliminate the frame region.

Now, a frame region 81a of a generic liquid crystal display panel (e.g., a TN (Twisted Nematic) type liquid crystal panel) 500 will be described with reference to FIG. 9(a) and FIG. 9(b). FIG. 9(a) is a schematic plan view of the liquid crystal display panel 500, and FIG. 9(b) is a schematic cross-sectional view of an a portion shown in FIG. 9(a).

The liquid crystal display panel 500 has a displaying region 81 and a frame region 81a located at the periphery of the displaying region 81. A plurality of pixel electrodes 4 are formed in the displaying region 81 of the liquid crystal display panel 500. The frame region 81a is a region which does not contribute to displaying. In the frame region 81a of the liquid crystal display panel 500, a sealing portion 99 is formed so as to surround the liquid crystal layer 1. The width Ds of the frame region 81a is expressed as a sum of the width D1 of the sealing portion 99 and the distance D2 between the sealing portion 99 and a pixel electrode 4 which is adjacent to the sealing portion 99 (where the distance D2 may be about 1.5 mm, for example). The sealing portion 99 is formed by using a dispenser apparatus, a screen printer, or the like to apply a sealant on a substrate so as to constitute a predetermined pattern, and, after this is attached to the other substrate, curing the sealant. The final width D1 of the sealing portion 99 is about 1 mm or more.

On the other hand, Patent Document 1 discloses a liquid crystal display panel having a polymer dispersed liquid crystal (PDLC) layer in which a curable vinyl compound is used. Patent Document 2 states that forming a polymer dispersed liquid crystal layer from a curable vinyl compound provides an effect of adhesively bonding the pair of substrates, without even forming the sealing portion 99 which would belong to the liquid crystal display panel 500.

CITATION LIST

Patent Literature

[Patent Document 1] Japanese Patent No. 2550627
[Patent Document 2] Japanese Laid-Open Patent Publication No. 2000-305100
[Patent Document 3] Japanese Laid-Open Patent Publication No. 2004-326140
[Patent Document 4] Japanese Laid-Open Patent Publication No. 2006-3626
[Patent Document 5] International Publication No. 2009/084162
[Patent Document 6] International Publication No. 2006/132369

SUMMARY OF INVENTION

Technical Problem

The liquid crystal display panel disclosed in Patent Document 1, in which no sealing portion is formed, has a problem in that the display quality of the periphery of the displaying region becomes lower than the display quality in the central portion of the displaying region, when viewed obliquely.

The present invention has been made in view of the above problems, and an objective thereof is to provide a liquid crystal display panel in which, even with a narrowed frame region, the display quality of the periphery of the displaying region is unlikely to worsen when viewed obliquely.

Solution to Problem

A liquid crystal display panel according to an embodiment of the present invention is a liquid crystal display panel comprising a first substrate having a pixel electrode formed thereon, a second substrate opposing the first substrate, and a liquid crystal layer retained between the first substrate and the second substrate, wherein, the liquid crystal layer edges near at least one of side faces of the liquid crystal display panel, and the liquid crystal display panel comprises a black layer in contact with a side face of the liquid crystal layer, along which side face the liquid crystal layer edges near at least one of the side faces of the liquid crystal display panel.

In one embodiment, the black layer has an OD value of 2.0 or more.

In one embodiment, the liquid crystal display panel is a liquid crystal display panel comprising a first substrate having a pixel electrode formed thereon, a second substrate opposing the first substrate, and a liquid crystal layer retained between the first substrate and the second substrate, wherein, the liquid crystal layer edges near at least one of side faces of the liquid crystal display panel; and the liquid crystal display panel comprises a specular layer in contact with a side face of the liquid crystal layer, along which side face the liquid crystal layer edges near at least one of the side faces of the liquid crystal display panel.

In one embodiment, the liquid crystal layer includes a plurality of liquid crystal regions containing a nematic liquid crystal material and polymer-containing walls between adjacent ones of the plurality of liquid crystal regions.

In one embodiment, a distance between the side face of the liquid crystal layer and the at least one side face of the liquid crystal display panel is 3 mm or less.

In one embodiment, when viewed from a normal direction of the liquid crystal display panel, at least one of the side faces of the liquid crystal layer is level with both a side face of the first substrate and a side face of the second substrate.

In one embodiment, when viewed from a normal direction of the liquid crystal display panel, one side of an outer edge of the pixel electrode is level with one side of an outer edge of the first substrate.

In one embodiment, the above liquid crystal display panel further comprises: a first alignment film and a second alignment film formed between the liquid crystal layer and, respectively, the first substrate and second substrate, each of the first alignment film and the second alignment film being formed so as to be in contact with the liquid crystal layer; and polarizers respectively provided on sides of the first substrate and the second substrate respectively opposite from the liquid crystal layer.

In one embodiment, the nematic liquid crystal material has positive dielectric anisotropy; and the first alignment film and the second alignment film are each a vertical alignment film.

In one embodiment, the nematic liquid crystal material has positive dielectric anisotropy; at least one of the first alignment film and the second alignment film is a horizontal alignment film; the horizontal alignment film has been subjected to an alignment treatment; and in the plurality of liquid crystal regions, in the absence of applied voltage, an in-plane azimuth of liquid crystal molecules at an interface of the horizontal alignment film having been subjected to an alignment treatment is parallel to an azimuth that is defined by the alignment treatment.

In one embodiment, an alignment state of the nematic liquid crystal material is controlled with a lateral electric field.

In one embodiment, the pixel electrode includes a pair of interdigitated electrodes, the pair of interdigitated electrodes including a first electrode and a second electrode located within a pixel, and a third electrode located between the first electrode and the second electrode; and a width of each of the first electrode and the second electrode is half of a width of the third electrode.

In one embodiment, the nematic liquid crystal material has negative dielectric anisotropy; and the first alignment film and the second alignment film are each a vertical alignment film.

A liquid crystal display device according to an embodiment of the present invention is a liquid crystal display device comprising a first liquid crystal display panel and a second liquid crystal display panel, wherein, each of the first liquid crystal display panel and the second liquid crystal display panel includes a first substrate having a plurality of pixel electrodes formed thereon, a second substrate opposing the first substrate, and a liquid crystal layer retained between the first substrate and the second substrate, the liquid crystal layer edging near at least one of the side faces of each liquid crystal display panel; the plurality of pixel electrodes of the first liquid crystal display panel include a first pixel electrode such that, when viewed from a normal direction of the first liquid crystal display panel, one side of an outer edge of the pixel electrode is level with one side of an outer edge of the first substrate; the plurality of pixel electrodes of the second liquid crystal display panel include a second pixel electrode such that, when viewed from a normal direction of the second liquid crystal display panel, one side of an outer edge of the pixel electrode is level with one side of an outer edge of the first substrate; and the first liquid crystal display panel and the second liquid crystal display panel are disposed so that the first pixel electrode and the second pixel electrode adjoin each other.

Advantageous Effects of Invention

According to an embodiment of the present invention, there is provided a liquid crystal display panel in which, even with a narrowed frame region, the display quality of the periphery of the displaying region is unlikely to worsen when viewed obliquely.

DESCRIPTION OF EMBODIMENTS

Hereinafter, with reference to the drawings, embodiments of the liquid crystal display panel according to the present invention will be described. However, the present invention is not limited to the following embodiments.

Figure 1:
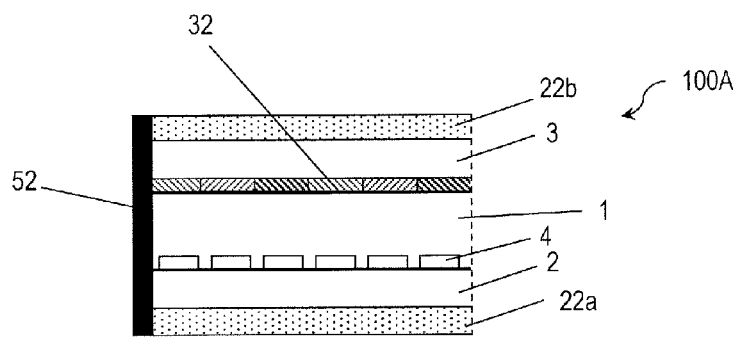
FIG. 1 (a) is a schematic cross-sectional view of a liquid crystal display panel 100A according to an embodiment of the present invention; and (b) is a schematic cross-sectional view for describing a liquid crystal layer 1 of the liquid crystal display panel 100A.
Figure 1:
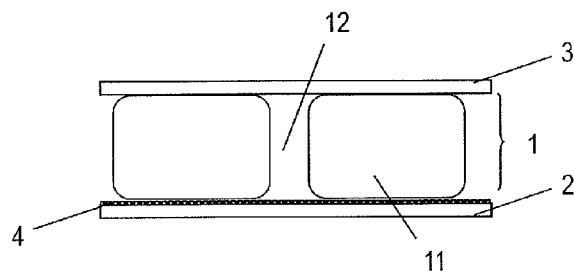
Figure 2:
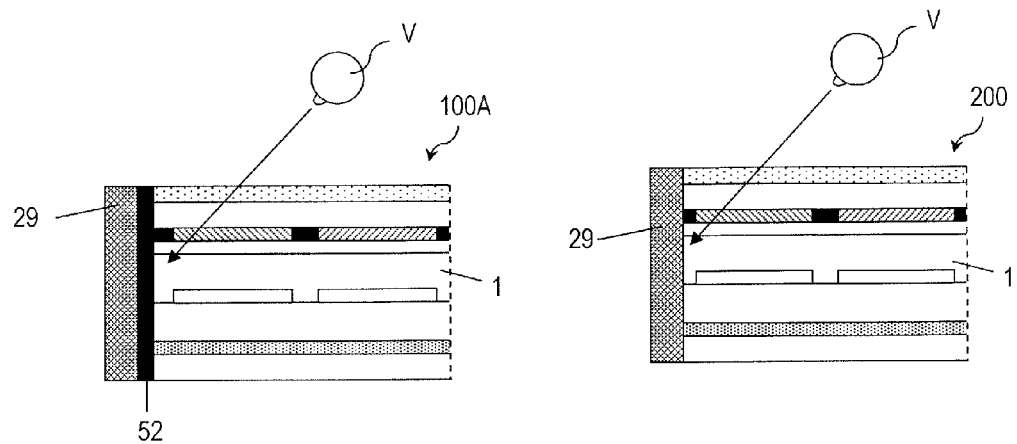
FIG. 2 (a) is a schematic cross-sectional view of the liquid crystal display panel 100A; and (b) is a schematic cross-sectional view of a liquid crystal display panel 200 according to Comparative Example.

With reference to FIG. 1 and FIG. 2, a liquid crystal display panel 100A according to an embodiment of the present invention will be described. FIG. 1(a) is a schematic cross-sectional view of the liquid crystal display panel 100A. FIG. 1(b) is a cross-sectional view for describing a liquid crystal layer 1. FIG. 2(a) is a schematic cross-sectional view of the liquid crystal display panel 100A, and FIG. 2(b) is a schematic cross-sectional view of a liquid crystal display panel 200 according to Comparative Example. In FIG. 2(a) and FIG. 2(b), V denotes a viewer. The liquid crystal display panel 200 of Comparative Example is a liquid crystal display panel lacking the black layer 52 of the liquid crystal display panel 100A.

As shown in FIG. 1(a) and FIG. 1(b), the liquid crystal display panel 100A includes a first substrate 2 on which pixel electrodes 4 are formed, a second substrate 3 opposing the first substrate 2, and a liquid crystal layer 1 retained between the first substrate (e.g., a glass substrate) 2 and the second substrate (e.g., a glass substrate) 3. In the present embodiment, the liquid crystal layer 1 includes a plurality of liquid crystal regions 11 containing a nematic liquid crystal material, and polymer-containing walls 12 between adjacent ones of the plurality of liquid crystal regions 11. Without being limited to this, the liquid crystal layer 1 may be a liquid crystal layer which contains a nematic liquid crystal material or any other liquid crystal material but which does not have the walls 12. One pixel electrode 4 is formed for each pixel. The pixel electrodes 4 are made of ITO (Indium Tin Oxide), for example. The polymer-containing walls 12 contribute to adhesion between the first substrate 2 and the second substrate 3. The liquid crystal layer 1 edges near at least one of the side faces of the liquid crystal display panel 100A. When viewed from the normal direction of the liquid crystal display panel 100A, it is preferable that the side face(s) of the liquid crystal layer 1 is at least partially level with the side face(s) of the first substrate 2 and the side face(s) of the second substrate 3; however, the side face(s) of the liquid crystal layer 1 may be at least partially distanced from the side face of the liquid crystal display panel 100A within 3 mm. The liquid crystal display panel 100A includes a black layer 52 that is in contact with the side face of the liquid crystal layer 1 along which the liquid crystal layer 1 edges near at least one of the side faces of the liquid crystal display panel 100A. In the liquid crystal display panel 100A, it is not necessary to form a sealing portion surrounding the liquid crystal layer 1, and therefore the pixel electrodes 4 can be formed to near at least one of the side faces of the liquid crystal display panel 100A. As a result, the width of the frame region not contributing to displaying can be made small in the liquid crystal display panel 100A. Furthermore, as shown in FIG. 2(b), in the liquid crystal display panel 200 lacking the black layer 52 and the sealing portion, the housing 29 adjoining the liquid crystal display panel 200 will be visible during viewing from an oblique direction, thus lowering display quality. On the other hand, as shown in FIG. 2(a), the liquid crystal display panel 100A includes the black layer 52 to prevent any housing 29 adjoining the liquid crystal display panel 200 from being visible during viewing from an oblique direction, and thus display quality is unlikely to worsen.

The liquid crystal display panel 100A includes a first alignment film and a second alignment film (neither being shown) which are formed so as to be in contact with the liquid crystal layer 1, such that the first alignment film and the second alignment film are formed between the liquid crystal layer 1 and, respectively, the first substrate 2 and second substrate 3. Furthermore, the liquid crystal display panel 100A include polarizers 22a and 22b which are provided on the sides of the first substrate 2 and the second substrate 3 respectively opposite from the liquid crystal layer 1. On the first substrate 2, thin film transistors (TFTs) (not shown) are formed for the respective pixels, and a color filter layer 32 is formed on the second substrate 3 (see FIG. 1(a)).

Figure 3:
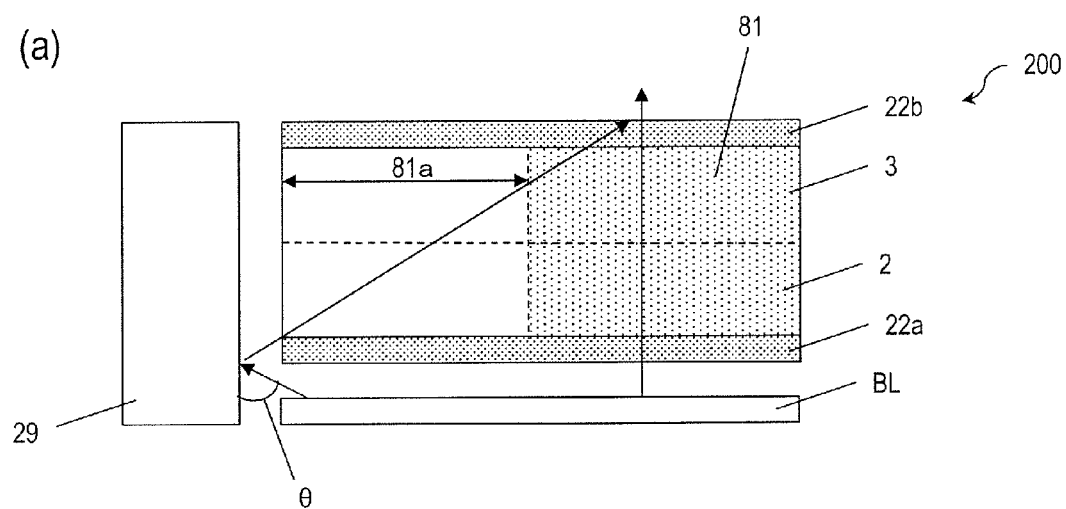
FIG. 3 (a) is a schematic cross-sectional view of the liquid crystal display panel 200 according to Comparative Example; and (b) is schematic cross-sectional view of the liquid crystal display panel 100A.
Figure 3:
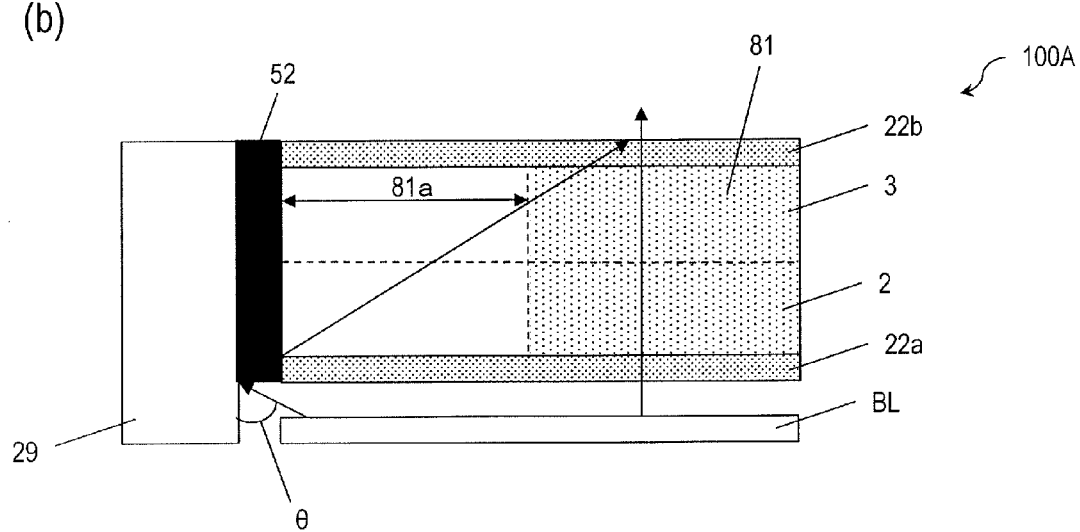

Next, the black layer 52 will be described with reference to FIG. 3.

FIG. 3(a) is a schematic cross-sectional view for describing the liquid crystal display panel 200 of Comparative Example, and FIG. 3(b) is a schematic cross-sectional view for describing the liquid crystal display panel 100A having the black layer 52.

The inventors have conducted simulations as to the display quality of the liquid crystal display panel 200 lacking the black layer 52 and the display quality of the liquid crystal display panel 100A where the black layer 52 had various OD (Optical Density) values. As is well known, an OD value is expressed as $-\log I/I0$, where $I0$ is the incident light amount and $I$ is the transmitted light amount. As the OD value increases, the transmitted light amount decreases. In the following, the light transmission characteristics of the black layer 52 are represented by OD values. As for simulation conditions, the first substrate 2 and second substrate 3 of the liquid crystal display panels 100A and 200 each had a thickness of 1 mm. Any component element of the liquid crystal display panels 100A and 200 (e.g., the liquid crystal layer 1, the pixel electrode 4, and the like) other than the first substrate 2 and second substrate 3 is thin, and therefore is ignored. A housing 29 was disposed on the outside of the liquid crystal display panels 100A and 200, with a backlight BL being disposed on the side of the first substrate 2 away from the second substrate 3. The housing 29 had a reflectance of 18% (standard reflectance). Moreover, the liquid crystal display panels 100A and 200 each had a frame region 81a located in the periphery of the panel, and a displaying region 81 on the side of the frame region 81a away from the housing 29. It was assumed that the backlight BL had a luminance of 100, and the polarizers 22a and 22b each had a transmittance of 50%. Furthermore, light being emitted from the backlight BL and incident on the housing 29 had an angle θ. The only difference between the liquid crystal display panel 100A and the liquid crystal display panel 200 is whether the black layer 52 is provided or not.

In a white displaying state of the liquid crystal display panels 100A and 200, the light transmittance was about 5% to 10%. In the liquid crystal display panel 200, light which was emitted from the backlight BL, reflected by the housing 29, and emitted from the liquid crystal display panel 200 was found to have a transmittance of 9%. Therefore, the light reflected by the housing 29 may cause whitish displaying, thus detracting from display quality. In particular, when θ is 30°, display quality is lowered within 1.2 mm inside (toward the displaying region 81) from the side face of the liquid crystal display panel 200; when θ is 45°, display quality is lowered within 2 mm inside from the side face of the liquid crystal display panel 200; and when θ is 60°, display quality is lowered within 3.5 mm inside from the side face of the liquid crystal display panel 200. For example, when θ is 60° and the frame region 81a has a width of 3 mm, display quality is lowered within 0.5 mm inside from the frame region 81a.

The aforementioned deterioration in display quality is reduced by placing the black layer 52 between the housing and the liquid crystal layer 1 of the liquid crystal display panel 100A. Specifically, when the OD value of the black layer 52 is 1.0, light which is reflected by the housing 29 and emitted from the liquid crystal display panel 100A has a transmittance of about 2%; and when the OD value of the black layer 52 is 2.0 or more, light which is reflected by the housing 29 and emitted from the liquid crystal display panel 200 has a transmittance of about 0%. Furthermore, when the OD value of the black layer 52 is 2.0, the liquid crystal display panel 100A has a contrast ratio of 1:111; and when the OD value of the black layer 52 is 3.0, the liquid crystal display panel 100A has a contrast ratio of 1:1111. When the OD value of the black layer 52 is 4.0, the liquid crystal display panel 100A has a contrast ratio of 1:11111. Therefore, the OD value of the black layer 52 is preferably 2.0 or more, and more preferably 3.0 or more.

Figure 9:
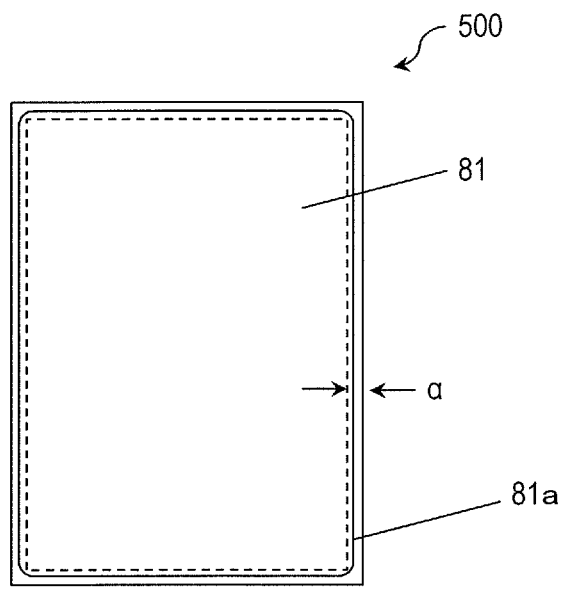
FIG. 9 (a) is a schematic plan view of a conventional liquid crystal display panel 500; and (b) is a schematic cross-sectional view of a portion shown at α in (a).
Figure 9:
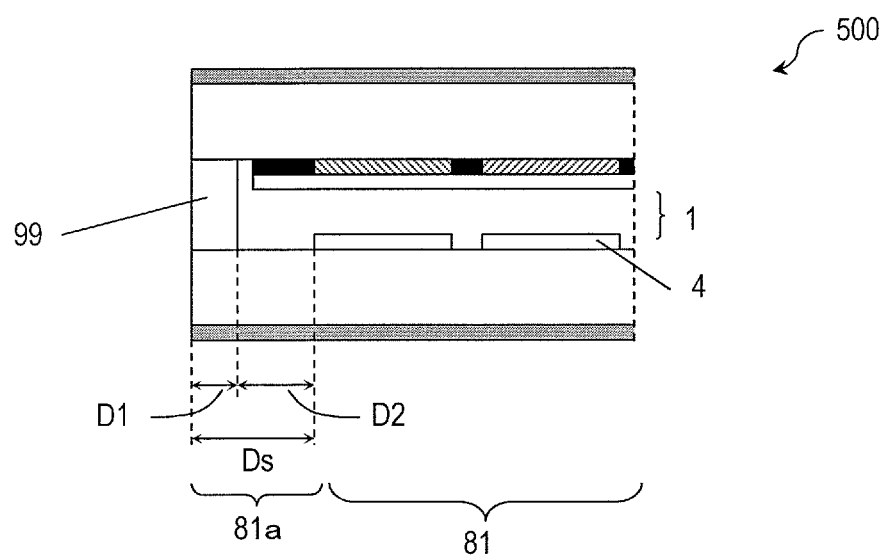

The black layer 52 is made of a thermosetting or photocurable black resin, for example. Otherwise, the black layer 52 may be made of a black film or tape, for example. Forming the black layer 52 can prevent moisture and the like from intruding into the liquid crystal layer 1. Note that, when the width Ds of the liquid crystal display panel 500 shown in FIG. 9(b) is 3 mm or less, the sealing portion 99 may be made of a thermosetting or photocurable black resin, for example. In this case, as described above, the OD value of the sealing portion 99 which is made of black resin is preferably 2.0 or more, and more preferably 3.0 or more.

Figure 4:
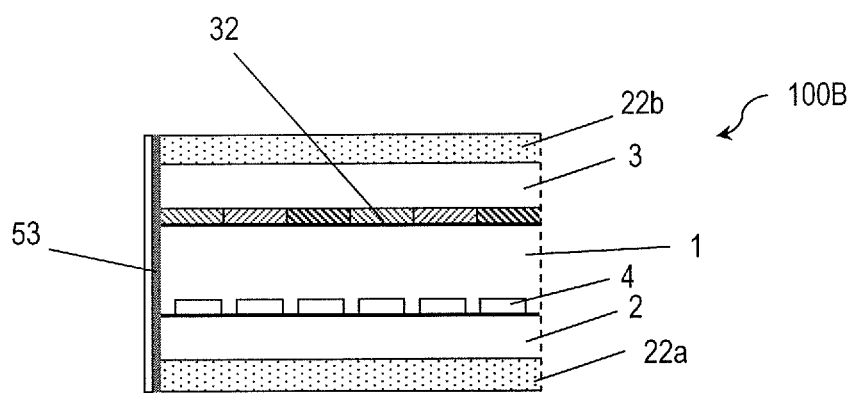
FIG. 4 (a) is a schematic cross-sectional view of a liquid crystal display panel 100B according to another embodiment of the present invention; and (b) and (c) are schematic cross-sectional views for describing the liquid crystal display panel 100B.
Figure 4:
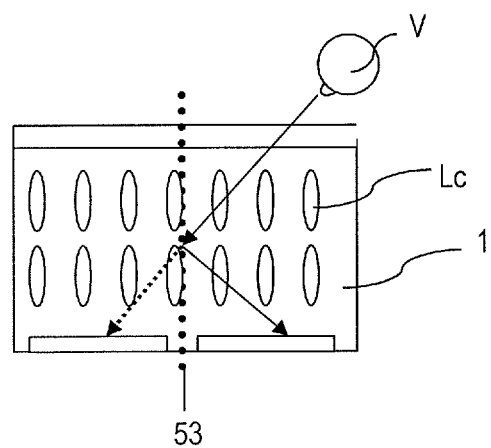
Figure 4:
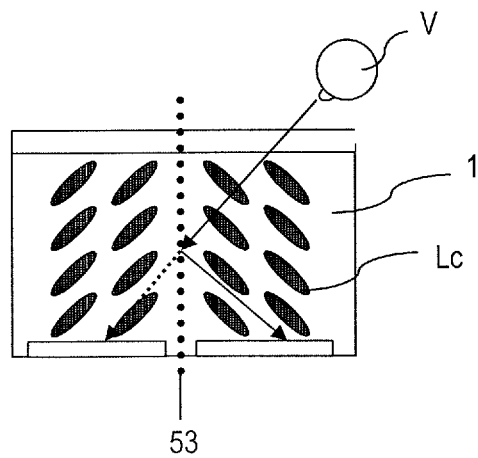

Next, with reference to FIG. 4, a liquid crystal display panel 100B according to another embodiment of the present invention will be described. FIG. 4(a) is a schematic cross-sectional view of the liquid crystal display panel 100B. FIG. 4(b) and FIG. 4(c) are schematic cross-sectional views for describing the liquid crystal display panel 100B. In FIG. 4(b) and FIG. 4(c), Lc represents a nematic liquid crystal material.

As shown in FIG. 4(a), the liquid crystal display panel 100B is a liquid crystal display panel in which a specular layer 53 is disposed, instead of the black layer 52 of the liquid crystal display panel 100A. By thus disposing the specular layer 53, when the liquid crystal display panel 100B is in a black displaying state, light which is reflected by the specular layer 53 is absorbed by the polarizer 22b, so that no leakage of light occurs; when the liquid crystal display panel 100B is in a white displaying state, light which is reflected by the specular layer 53 is transmitted through the polarizer 22b, so that deterioration in display quality is unlikely to occur.

Furthermore, as shown in FIG. 4(b) and FIG. 4(c), when the viewer V obliquely views the liquid crystal display panel 100B, the image which appears on the specular layer 53 is an image (mirror image) which is plane-symmetric of the liquid crystal layer 1, with respect to a plane of symmetry which is the specular layer 53. Therefore, as shown in FIG. 4(b), in the absence of applied voltage, if the nematic liquid crystal material Lc is aligned perpendicularly to the first substrate 2, for example, the image which appears on the specular layer 53 is identical to that on the liquid crystal layer 1; therefore, the display quality of the liquid crystal display panel 100B is not deteriorated. Furthermore, as shown in FIG. 4(c), under an applied voltage, if the nematic liquid crystal material Lc is aligned with a tilt relative to the first substrate 2 (e.g., in states from gray-scale displaying to white displaying), for example, the images that appear on the liquid crystal layer 1 and the specular layer 53 are of plane-symmetric relationship with respect to a plane of symmetry which is the specular layer 53. Therefore, an optical compensation effect is obtained, thus reducing discrepancies in γ characteristics, resulting in a displaying which is close to the displaying under frontal viewing.

Figure 5:
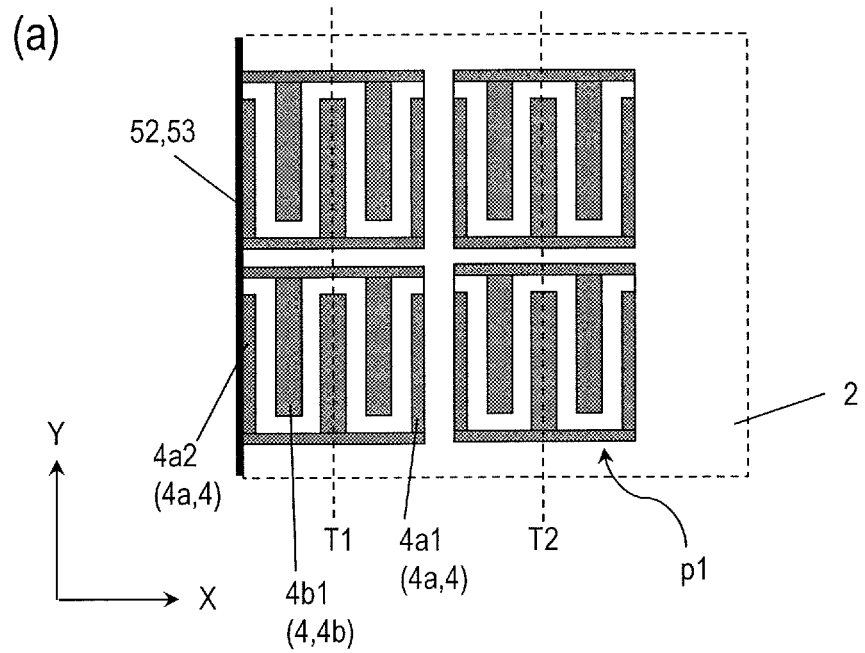
FIG. 5 (a) is a schematic plan view of a first substrate 2 of the liquid crystal display panel 100B; and (b) is a schematic cross-sectional view for describing the liquid crystal display panel 100B.
Figure 5:
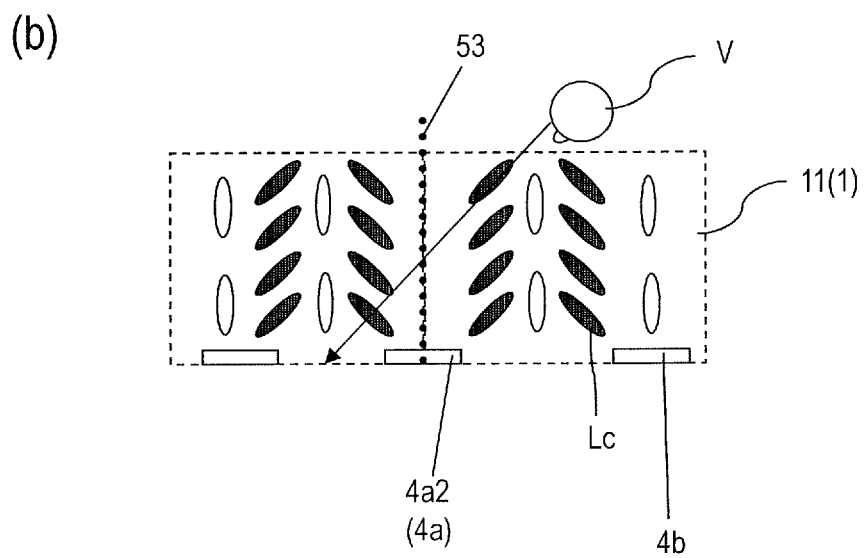

Next, with reference to FIG. 5, the liquid crystal layer 1 of the liquid crystal display panels 100A and 100B and the pixel electrodes 4 which control the alignment state of the liquid crystal material of the liquid crystal layer 1 will be described.

FIG. 5(a) is a schematic plan view for describing the pixel electrodes 4, and FIG. 5(b) is a schematic cross-sectional view for describing an alignment state of the liquid crystal layer 1.

The liquid crystal display panels 100A and 100B each include a first vertical alignment film (not shown) which is formed on the first substrate 2 so as to be in contact with the liquid crystal layer 1 and a second vertical alignment film (not shown) which is formed on the second substrate 3 so as to be in contact with the liquid crystal layer 1. The liquid crystal region 11 of the liquid crystal layer 1 contains a nematic liquid crystal material Lc having a positive dielectric anisotropy.

As shown in FIG. 5(a), a pair of interdigitated electrodes 4a and 4b are formed for each pixel p1, on the first substrate 2 of each of the liquid crystal display panels 100A and 100B. With a lateral electric field from the pair of interdigitated electrodes 4a and 4b, the alignment state of the nematic liquid crystal material Lc in the liquid crystal layer 1 is controlled. The liquid crystal display panels 100A and 100B as such are called liquid crystal display panels of the TBA (Transverse Bend Alignment) driving mode. A liquid crystal display panel of the TBA driving mode is disclosed in Patent Document 2, for example. Moreover, instead of the first vertical alignment film and second vertical alignment films of the liquid crystal display panels 100A and 100B, at least one horizontal alignment film may be formed, and this horizontal alignment film may be subjected to an alignment treatment, thus modifying the liquid crystal display panels 100A and 100B into liquid crystal display panels of the IPS (In Plane Switching) driving mode. At this time, in the plurality of liquid crystal regions 11 of the liquid crystal layer 1, the in-plane azimuth of the liquid crystal molecules at an interface of the horizontal alignment film having been subjected to an alignment treatment is parallel to the azimuth that is defined by the alignment treatment, in the absence of applied voltage. Otherwise, they might also be modified into liquid crystal display panels of the FFS (Fringe Field Switching) driving mode. In either the IPS or FFS driving mode, the alignment state of the nematic liquid crystal material is controlled with a lateral electric field.

Especially in the liquid crystal display panel 100B, it is preferable that, as shown in FIG. 5(a), one side of the outer edge of a pixel electrode 4 is level with one side of the outer edge of the first substrate 2 when viewed from a normal direction of the liquid crystal display panel 100B. It is preferable that the specular layer 53 is disposed level with the outer edge of the first substrate 2 that is level with the one side of the outer edge of the pixel electrode 4. Specifically, when viewed from a normal direction of the liquid crystal display panel 100B, a portion 4a2 of the interdigitated electrode 4a is level with one side of the outer edge of the first substrate 2. Furthermore, it is preferable that the pair of interdigitated electrodes 4a and 4b of each pixel p1 are formed so as to be axisymmetrical with respect to an axis of symmetry T1, T2 which is a line parallel to the side of the first substrate 2 that is level with the specular layer 53 and which extends through the center of the pixel p1, when viewed from a normal direction of the liquid crystal display panel 100B. Moreover, it is preferable that the pair of interdigitated electrodes 4a and 4b include electrodes 4a1 and 4a2 which are located at the outermost edge within one pixel p1, as well as an electrode 4b1 which is located between electrodes 4a1 and 4a2, such that the electrodes 4a1 and 4a2 each have a width which is half of the width of the electrode 4b1. In other words, it is preferable that, in the pair of interdigitated electrodes 4a and 4b within one pixel p1, the width of the electrodes 4a1 and 4a2, which are located at the outermost edge and which extend in a direction parallel to the direction that the specular layer 53 extends (i.e., the Y direction in the figure), is half of the width (i.e., the length along the direction which is parallel to the X direction in the figure) of any other electrode 4b which extends in a direction parallel to the direction that the specular layer 53 extends.

By thus forming the pair of interdigitated electrodes 4a and 4b, as shown in FIG. 5(b), the image which appears on the specular layer 53 will be an image (mirror image) which is plane-symmetric with that on the liquid crystal layer 1, with respect to a plane of symmetry which is the specular layer 53. Thus, in states from gray-scale displaying to white displaying, the aforementioned optical compensation effect is obtained, and a liquid crystal display panel 100B with a high display quality is obtained.

Figure 6:
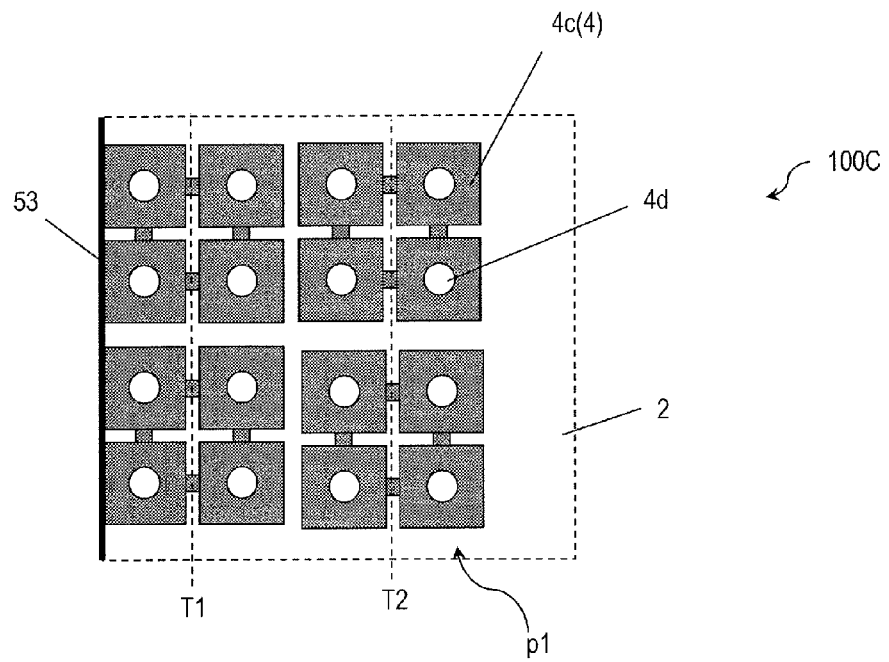
FIG. 6 (a) is a schematic plan view of a first substrate 2 of a liquid crystal display panel 100C according to still another embodiment of the present invention; (b) is a schematic plan view for describing the relationship between a subpixel electrode 4c and the alignment state of liquid crystal material Lc; and (c) is a schematic cross-sectional view for describing the liquid crystal display panel 100C.
Figure 6:
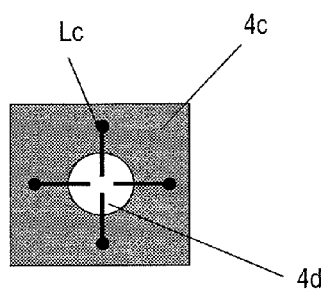
Figure 6:
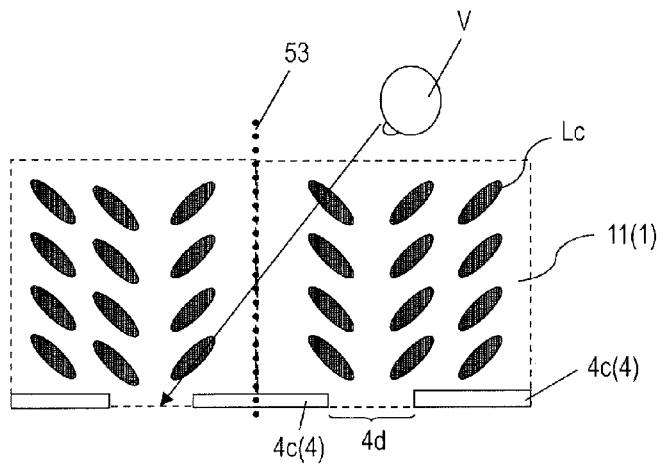

The liquid crystal display panels 100A and 100B can be modified into liquid crystal display panels of the CPA (Continuous Pinwheel Alignment) driving mode, for example. FIG. 6 is a schematic view for describing a liquid crystal display panel 100C according to another embodiment of the present invention. FIG. 6(a) is a schematic plan view of the first substrate 2 of the liquid crystal display panel 100C; FIG. 6(b) is a schematic plan view for describing the alignment state of the nematic liquid crystal material Lc; and FIG. 6(c) is a schematic cross-sectional view for describing the alignment state of the liquid crystal layer 1. Note that liquid crystal display devices of the CPA driving mode are disclosed in Patent Documents 3 and 4, for example.

As shown in FIG. 6(a), the liquid crystal display panel 100C is a liquid crystal display panel obtained by modifying the liquid crystal display panel 100B into a liquid crystal display panel of the CPA driving mode. Specifically, on the first substrate 2, instead of a pair of interdigitated electrodes 4a and 4b, a pixel electrode 4 is formed for each pixel p1, while a common electrode (not shown) is formed on the second substrate 3. Moreover, the nematic liquid crystal material in the liquid crystal region 11 may contain a chiral agent in some cases. The pixel electrode 4 includes a plurality of rectangular subpixel electrodes 4c, with circular apertures 4d being formed in the substantial centers of the subpixel electrodes 4c. The plurality of subpixel electrodes 4c are electrically connected to one another within a single pixel p1. As shown in FIG. 6(b), when a predetermined voltage is applied across the liquid crystal layer 1 of the liquid crystal display panel 100C, which includes the pixel electrodes 4 having subpixel electrodes 4c, oblique electric fields that are generated near the outer edges of the subpixel electrodes 4c and also in the apertures 4d create a plurality of liquid crystal domains which take radially-inclined alignment states centered around the apertures 4d. A liquid crystal domain is formed upon each subpixel electrode 4c. Since the liquid crystal molecules Lc in each liquid crystal domain are tilted in substantially all azimuths, displaying with a wide viewing angle is realized.

In the liquid crystal display panel 100C, too, similarly to the liquid crystal display panel 100B, it is preferable that one side of the outer edge of a pixel electrode 4 is level with one side of the outer edge of the first substrate 2 when viewed from the normal direction of the liquid crystal display panel 100C. It is preferable that the specular layer 53 is disposed level with the outer edge of the first substrate 2 that is level with the one side of the outer edge of the pixel electrode 4. Specifically, when viewed from the normal direction of the liquid crystal display panel 100C, one side of the outer edge of the subpixel electrode 4c is level with one side of the outer edge of the first substrate 2. Furthermore, it is preferable that the pixel electrode 4 of each pixel p1 is formed so as to be axisymmetrical with respect to an axis of symmetry T1, T2 which is a line parallel to the side of the first substrate 2 that is level with the specular layer 53 and which extends through the center of the pixel p1, when viewed from the normal direction of the liquid crystal display panel 100C.

By thus forming the pixel electrode 4, as shown in FIG. 6(c), the image which appears on the specular layer 53 will be an image (mirror image) which is plane-symmetric with that on the liquid crystal layer 1, with respect to a plane of symmetry which is the specular layer 53. Thus, in states from gray-scale displaying to white displaying, the aforementioned optical compensation effect is obtained, and a liquid crystal display panel 100C with a high display quality is obtained.

Other than the above-described liquid crystal display panel 100C of the CPA driving mode, the liquid crystal display panels 100A and 100B may be modified into liquid crystal display panels having fishbone-type pixel electrodes 4, or liquid crystal display panels of the 4D-RTN (4 Domain-Reverse Twisted Nematic) driving mode, for example.

Next, with reference to FIG. 7, liquid crystal display panels 100D and 100E according to still other embodiments will be described. FIG. 7(a) is a schematic plan view of the first substrate 2 of the liquid crystal display panel 100D. FIG. 7(b) is a schematic plan view of the first substrate 2 of the liquid crystal display panel 100E. FIG. 7(c) is a schematic cross-sectional view for describing alignment states of the respective liquid crystal layers 1 of the liquid crystal display panels 100D and 100E. Note that a liquid crystal display panel 100D having fishbone-type pixel electrodes 4 is disclosed in Patent Document 5, for example. Moreover, a liquid crystal display panel 100E of the 4D-RTN driving mode is disclosed in Patent Document 6, for example.

As shown in FIG. 7(a), the liquid crystal display panel 100D is a liquid crystal display panel in which fishbone-type pixel electrodes 4e are formed as if the pixel electrodes 4 of the liquid crystal display panel 100B. Each fishbone-type pixel electrode 4e includes a stem 4ea which is formed in a cross shape, branches 4eb extending along a first direction (e.g., azimuth angle 45°; 225° direction), and branches 4ec extending along a second direction (e.g., azimuth angle 135°; 315° direction) which is different from the first direction.

As shown in FIG. 7(b), the liquid crystal display panel 100E is a liquid crystal display panel in which pixel electrodes 4f each covering one pixel p1 are formed as if the pixel electrodes 4 of the liquid crystal display panel 100B, and in which vertical-alignment type photo-alignment films (not shown) are formed instead of the vertical alignment films of the liquid crystal display panel 100B. The vertical-alignment type photo-alignment films of the liquid crystal display panel 100E have been subjected to a desired photo-alignment treatment, and the liquid crystal display panel 100E possesses a wide viewing angle without having complicated electrode structures such as the aforementioned fishbone-type pixel electrodes 4e.

In the liquid crystal display panels 100D and 100E, too, similarly to the liquid crystal display panel 100B, it is preferable that one side of the outer edge of a pixel electrode 4 is level with one side of the outer edge of the first substrate 2 when viewed from the normal direction of the liquid crystal display panel 100D (or the liquid crystal display panel 100E). It is preferable that the specular layer 53 is disposed level with the outer edge of the first substrate 2 that is level with the one side of the outer edge of the pixel electrode 4. Specifically, when viewed from the normal direction of the liquid crystal display panel 100D (or the liquid crystal display panel 100E), one side of the outer edge of a pixel electrode 4e (or a pixel electrode 4*f*) is level with one side of the outer edge of the first substrate 2. Furthermore, it is preferable that the pixel electrode 4 of each pixel p1 is formed so as to be axisymmetrical with respect to an axis of symmetry T1, T2 which is a line parallel to the side of the first substrate 2 that is level with the specular layer 53 and which extends through the center of the pixel p1, when viewed from the normal direction of the liquid crystal display panel 100D (or the liquid crystal display panel 100E). In the liquid crystal display panel 100D, it is preferable that one side of the outer edge of each branch 4*ec* is level with one side of the outer edge of the first substrate 2.

Figure 7:
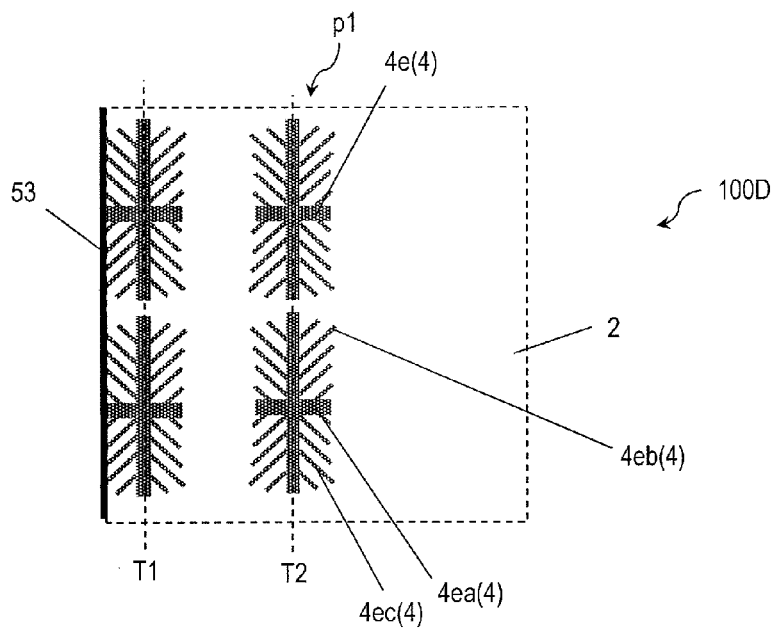
FIG. 7 (a) is a schematic plan view of a first substrate 2 of a liquid crystal display panel 100D according to still another embodiment of the present invention; (b) is a schematic plan view of a first substrate 2 of a liquid crystal display panel 100E according to still another embodiment of the present invention; and (c) is a schematic cross-sectional view for describing the liquid crystal display panels 100D and 100E.
Figure 7:
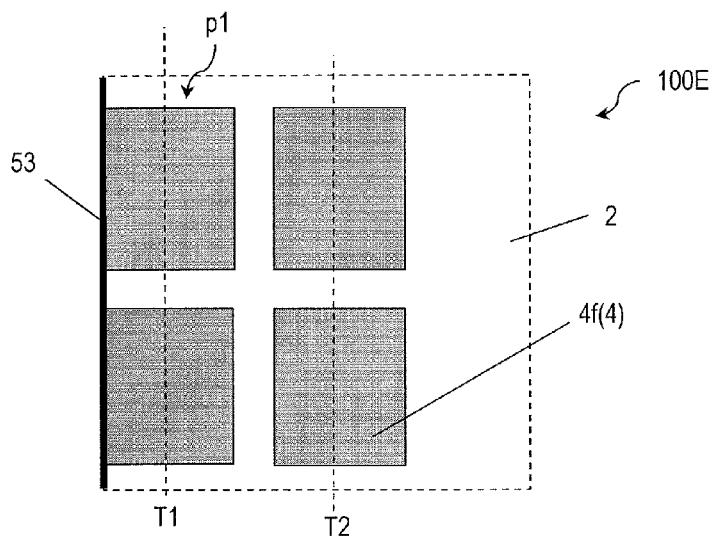
Figure 7:
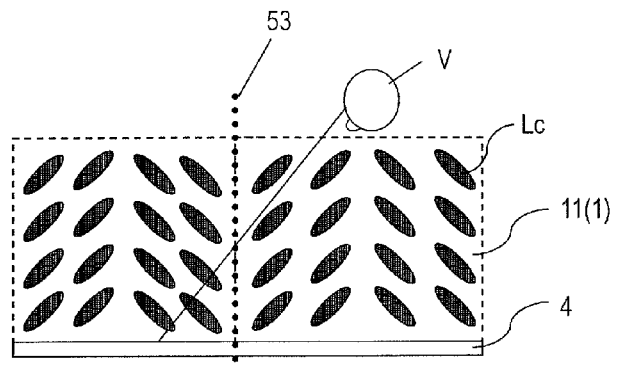

By thus forming the pixel electrode 4, as shown in FIG. 7(*c*), the image which appears on the specular layer 53 will be an image (mirror image) which is plane-symmetric with that on the liquid crystal layer 1, with respect to a plane of symmetry which is the specular layer 53. Thus, in states from gray-scale displaying to white displaying, the aforementioned optical compensation effect is obtained, and liquid crystal display panels 100D and 100E with a high display quality is obtained.

Figure 8:
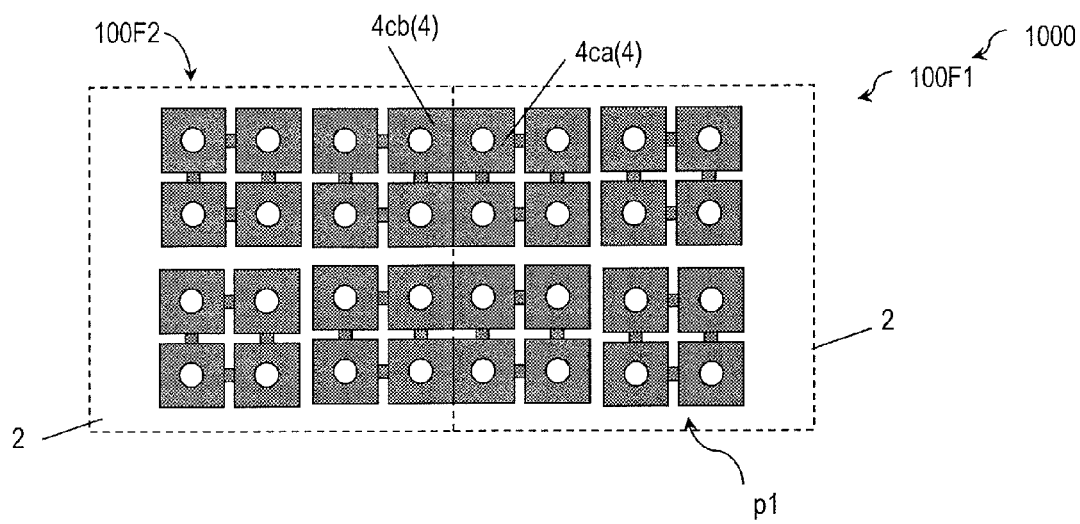
FIG. 8 (a) is a schematic plan view of a liquid crystal display device 1000 according to an embodiment of the present invention; and (b) is a schematic cross-sectional view for describing the liquid crystal display device 1000.
Figure 8:
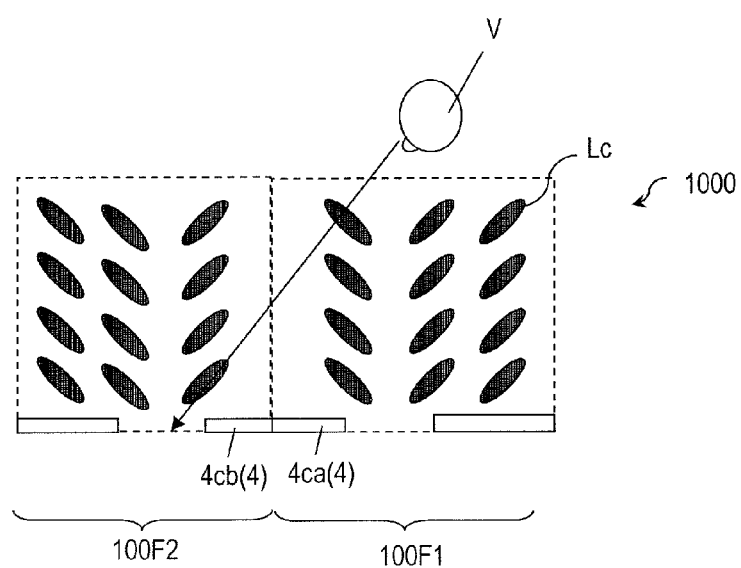

Next, with reference to FIG. 8, a liquid crystal display device 1000 according to an embodiment of the present invention will be described. FIG. 8(*a*) is a schematic plan view for describing the liquid crystal display device 1000, and FIG. 8(*b*) is a schematic cross-sectional view for describing the liquid crystal display device 1000. Component elements having counterparts in the liquid crystal display panel 100C will be denoted by identical reference numerals.

The liquid crystal display device 1000 has a liquid crystal display panel 100F1 and a liquid crystal display panel 100F2. The liquid crystal display panel 100F1 and the liquid crystal display panel 100F2 each include a first substrate 2 on which pixel electrodes 4 are formed, a second substrate 3 opposing the first substrate, and a liquid crystal layer 1 retained between the first substrate 2 and the second substrate 3. The liquid crystal layer 1 edges near at least one of the side faces of each of the liquid crystal display panels 100F1 and 100F2. The liquid crystal display panel 100F1 and the liquid crystal display panel 100F2 are disposed so that a first pixel electrode 4*ca*, such that one side of the outer edge of the pixel electrode 4 is level with one side of the outer edge of the first substrate 2 when viewed from the normal direction of the liquid crystal display panel 100F1, adjoins a second pixel electrode 4*cb*, such that one side of the outer edge of the pixel electrode 4 is level with one side of the outer edge of the first substrate 2 when viewed from the normal direction of the liquid crystal display panel 100F2. In the liquid crystal display device 1000 as such, the liquid crystal display panel 100F1 and the liquid crystal display panel 100F2 are disposed in a plane-symmetric manner with respect to a plane of symmetry which is the boundary between the liquid crystal display panel 100F1 and the liquid crystal display panel 100F2, and therefore, without providing the specular layer 53 described above, the aforementioned optical compensation effect is obtained and a high display quality is provided. With the liquid crystal display device 1000, the display quality during viewing from an oblique direction, in particular, is unlikely to worsen.

The liquid crystal display panels 100F1 and 100F2 have substantially the same structure as the liquid crystal display panel 100C, for example. However, unlike the liquid crystal display panel 100C, the liquid crystal display panels 100F1 and 100F2 do not have the specular layer 53. In the liquid crystal display panels 100F1 and 100F2, too, it is preferable that one side of the outer edge of a pixel electrode 4 is level with one side of the outer edge of the first substrate 2 when viewed from the normal direction of the liquid crystal display panel 100F1 (or the liquid crystal display panel 100F2). It is also preferable to form each pixel electrode 4 so that, when the liquid crystal display panel 100F1 and the liquid crystal display panel 100F2 are deployed in place, the pixel electrode 4 of the liquid crystal display panel 100F1 is axisymmetrical with the pixel electrode 4 of the liquid crystal display panel 100F2 with respect to an axis of symmetry which is the boundary between the liquid crystal display panel 100F1 and the liquid crystal display panel 100F2.

Thus, according to an embodiment of the present invention, there is provided a liquid crystal display panel and liquid crystal display device in which, even with a narrowed frame region, the display quality of the periphery of the displaying region is unlikely to worsen when viewed obliquely.

INDUSTRIAL APPLICABILITY

According to an embodiment of the present invention, there are provided a liquid crystal display panel and a liquid crystal display device which are suitable for a narrowed frame region. In particular, such a liquid crystal display panel is suitably used as a medium to small-sized device, e.g., an electronic book, a mobile phone, or a smartphone.

REFERENCE SIGNS LIST

1 liquid crystal layer
2, 3 substrate
4 pixel electrode
11 liquid crystal region
12 wall
22*a*, 22*b* polarizer
32 color filter layer
52 black layer
100A liquid crystal display panel

The invention claimed is:

1. A liquid crystal display panel comprising a first substrate having a pixel electrode formed thereon, a second substrate opposing the first substrate, and a liquid crystal layer retained between the first substrate and the second substrate, wherein,
    the liquid crystal layer edges near at least one of side faces of the liquid crystal display panel,
    the liquid crystal display panel comprises a black layer in contact with a side face of the liquid crystal layer, along which side face the liquid crystal layer edges near at least one of the side faces of the liquid crystal display panel, and
    when viewed from a normal direction of the liquid crystal display panel, at least one of the side faces of the liquid crystal layer is level with both a side face of the first substrate and a side face of the second substrate.

2. The liquid crystal display panel of claim 1, wherein the black layer has an OD value of 2.0 or more.

3. The liquid crystal display panel of claim 1, wherein the liquid crystal layer includes a plurality of liquid crystal regions containing a nematic liquid crystal material and polymer-containing walls between adjacent ones of the plurality of liquid crystal regions.

4. The liquid crystal display panel of claim 1, wherein a distance between the side face of the liquid crystal layer and the at least one side face of the liquid crystal display panel is 3 mm or less.

5. The liquid crystal display panel of claim 1, wherein, when viewed from a normal direction of the liquid crystal display panel, one side of an outer edge of the pixel electrode is level with one side of an outer edge of the first substrate.

6. The liquid crystal display panel of claim 1, further comprising:

a first alignment film and a second alignment film formed between the liquid crystal layer and, respectively, the first substrate and second substrate, each of the first alignment film and the second alignment film being formed so as to be in contact with the liquid crystal layer; and polarizers respectively provided on sides of the first substrate and the second substrate respectively opposite from the liquid crystal layer.

7. The liquid crystal display panel of claim 6, wherein,
the liquid crystal layer contains a nematic liquid crystal material, the nematic liquid crystal material having positive dielectric anisotropy; and
the first alignment film and the second alignment film are each a vertical alignment film.

8. The liquid crystal display panel of claim 6, wherein,
the liquid crystal layer contains a nematic liquid crystal material, the nematic liquid crystal material having positive dielectric anisotropy;
at least one of the first alignment film and the second alignment film is a horizontal alignment film;
the horizontal alignment film has been subjected to an alignment treatment; and
in the plurality of liquid crystal regions, in the absence of applied voltage, an in-plane azimuth of liquid crystal molecules at an interface of the horizontal alignment film having been subjected to an alignment treatment is parallel to an azimuth that is defined by the alignment treatment.

9. The liquid crystal display panel of claim 7, wherein an alignment state of the nematic liquid crystal material is controlled with a lateral electric field.

10. The liquid crystal display panel of claim 9, wherein,
the pixel electrode includes a pair of interdigitated electrodes,
the pair of interdigitated electrodes including
a first electrode and a second electrode located within a pixel, and
a third electrode located between the first electrode and the second electrode; and
a width of each of the first electrode and the second electrode is half of a width of the third electrode.

11. The liquid crystal display panel of claim 6, wherein,
the liquid crystal layer contains a nematic liquid crystal material, the nematic liquid crystal material having negative dielectric anisotropy; and
the first alignment film and the second alignment film are each a vertical alignment film.

12. A liquid crystal display device comprising a first liquid crystal display panel and a second liquid crystal display panel, wherein,
each of the first liquid crystal display panel and the second liquid crystal display panel includes
a first substrate having a plurality of pixel electrodes formed thereon, a second substrate opposing the first substrate, and a liquid crystal layer retained between the first substrate and the second substrate,
the liquid crystal layer edging near at least one of the side faces of each liquid crystal display panel;
the plurality of pixel electrodes of the first liquid crystal display panel include a first pixel electrode such that, when viewed from a normal direction of the first liquid crystal display panel, one side of an outer edge of the pixel electrode is level with one side of an outer edge of the first substrate;
the plurality of pixel electrodes of the second liquid crystal display panel include a second pixel electrode such that, when viewed from a normal direction of the second liquid crystal display panel, one side of an outer edge of the pixel electrode is level with one side of an outer edge of the first substrate; and
the first liquid crystal display panel and the second liquid crystal display panel are disposed so that the first pixel electrode and the second pixel electrode adjoin each other.

13. A liquid crystal display panel comprising a first substrate having a pixel electrode formed thereon, a second substrate opposing the first substrate, and a liquid crystal layer retained between the first substrate and the second substrate, wherein,
the liquid crystal layer edges near at least one of side faces of the liquid crystal display panel,
the liquid crystal display panel comprises a black layer in contact with a side face of the liquid crystal layer, along which side face the liquid crystal layer edges near at least one of the side faces of the liquid crystal display panel, and
when viewed from a normal direction of the liquid crystal display panel, one side of an outer edge of the pixel electrode is level with one side of an outer edge of the first substrate.

14. The liquid crystal display panel of claim 13, wherein the black layer has an OD value of 2.0 or more.

15. The liquid crystal display panel of claim 13, wherein the liquid crystal layer includes a plurality of liquid crystal regions containing a nematic liquid crystal material and polymer-containing walls between adjacent ones of the plurality of liquid crystal regions.

16. The liquid crystal display panel of claim 13, wherein a distance between the side face of the liquid crystal layer and the at least one side face of the liquid crystal display panel is 3 mm or less.

17. The liquid crystal display panel of claim 13, further comprising:
a first alignment film and a second alignment film formed between the liquid crystal layer and, respectively, the first substrate and second substrate, each of the first alignment film and the second alignment film being formed so as to be in contact with the liquid crystal layer; and
polarizers respectively provided on sides of the first substrate and the second substrate respectively opposite from the liquid crystal layer.

18. The liquid crystal display panel of claim 17, wherein,
the liquid crystal layer contains a nematic liquid crystal material, the nematic liquid crystal material having positive dielectric anisotropy;
at least one of the first alignment film and the second alignment film is a horizontal alignment film;
the horizontal alignment film has been subjected to an alignment treatment; and
in the plurality of liquid crystal regions, in the absence of applied voltage, an in-plane azimuth of liquid crystal molecules at an interface of the horizontal alignment film having been subjected to an alignment treatment is parallel to an azimuth that is defined by the alignment treatment.

19. The liquid crystal display panel of claim 18, wherein an alignment state of the nematic liquid crystal material is controlled with a lateral electric field.

20. The liquid crystal display panel of claim 17, wherein,
the liquid crystal layer contains a nematic liquid crystal material, the nematic liquid crystal material having negative dielectric anisotropy; and the first alignment film and the second alignment film are each a vertical alignment film.

* * * * *